(12) United States Patent
Ramey

(10) Patent No.: US 8,962,119 B1
(45) Date of Patent: Feb. 24, 2015

(54) TIRE DECORATION ASSEMBLY

(71) Applicant: Benjamin F. Ramey, North Brenwood, MD (US)

(72) Inventor: Benjamin F. Ramey, North Brenwood, MD (US)

( * ) Notice: Subject to any disclaimer, the term of this patent is extended or adjusted under 35 U.S.C. 154(b) by 229 days.

(21) Appl. No.: 13/672,049

(22) Filed: Nov. 8, 2012

(51) Int. Cl.
*B60B 7/01* (2006.01)
*B60C 99/00* (2006.01)

(52) U.S. Cl.
CPC ...................................... *B60C 99/00* (2013.01)
USPC ....................... 428/66.5; 428/66.6; 301/37.22

(58) Field of Classification Search
CPC .......................................................... B60B 7/01
USPC .................. 428/66.5, 66.6; 301/37.22, 37.23, 301/37.26, 37.27, 37.32, 37.11, 37.12, 301/37.42; 152/524
See application file for complete search history.

(56) References Cited

U.S. PATENT DOCUMENTS

| 4,235,271 A | 11/1980 | Olsen et al. |
| 5,105,308 A | 4/1992 | Holley et al. |
| 5,300,164 A | 4/1994 | DeTrano et al. |
| 6,286,573 B1 | 9/2001 | Hine |
| 6,372,311 B2 | 4/2002 | McCormack |
| 6,457,780 B1 | 10/2002 | Ernst |
| 6,460,938 B1 | 10/2002 | Baumgarten |
| D486,124 S | 2/2004 | LeFranc |
| 6,692,047 B1 | 2/2004 | Solon |
| 6,712,432 B1 | 3/2004 | Cheng |
| 6,767,945 B2 | 7/2004 | Hahn et al. |
| 2006/0175891 A1 | 8/2006 | Diaz |
| 2006/0266456 A1 | 11/2006 | Speyer et al. |
| 2010/0139832 A1 | 6/2010 | Rittweger |
| 2011/0248551 A1* | 10/2011 | Scicluna .................... 301/37.26 |

* cited by examiner

*Primary Examiner* — Alexander Thomas

(57) ABSTRACT

A tire decoration assembly facilitates changing of the cosmetic appearance of a tire. The assembly includes a first annular member having a front side and a back side. A connector is coupled to the back side of the first annular member wherein the first annular member is configured for coupling to an exterior surface of a sidewall of a tire. A second annular member has a front side and a back side. The back side of the second annular member is selectively coupled to the front side of the first annular member such that the front side of the second annular member is displayed on the tire.

6 Claims, 4 Drawing Sheets

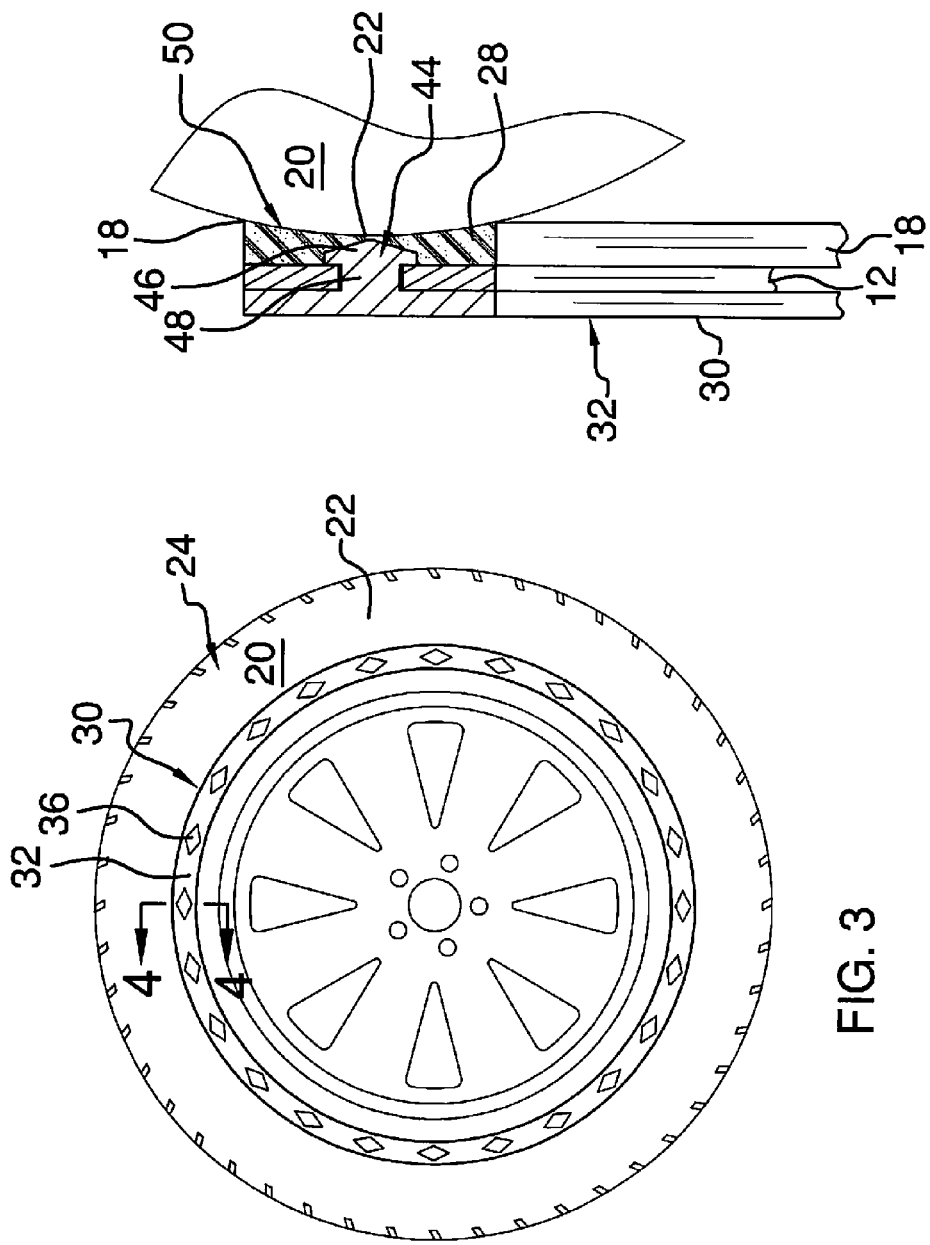

TIRE DECORATION ASSEMBLY

BACKGROUND OF THE DISCLOSURE

Field of the Disclosure

The disclosure relates to tire decoration devices and more particularly pertains to a new tire decoration device for facilitating changing of the cosmetic appearance of a tire.

SUMMARY OF THE DISCLOSURE

An embodiment of the disclosure meets the needs presented above by generally comprising a first annular member having a front side and a back side. A connector is coupled to the back side of the first annular member wherein the first annular member is configured for coupling to an exterior surface of a sidewall of a tire. A second annular member has a front side and a back side. The back side of the second annular member is selectively coupled to the front side of the first annular member such that the front side of the second annular member is displayed on the tire.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a cross-sectional view of an embodiment of the disclosure taken along line 4-4 of FIG. 3.

DESCRIPTION OF THE PREFERRED EMBODIMENT

Figure 1:
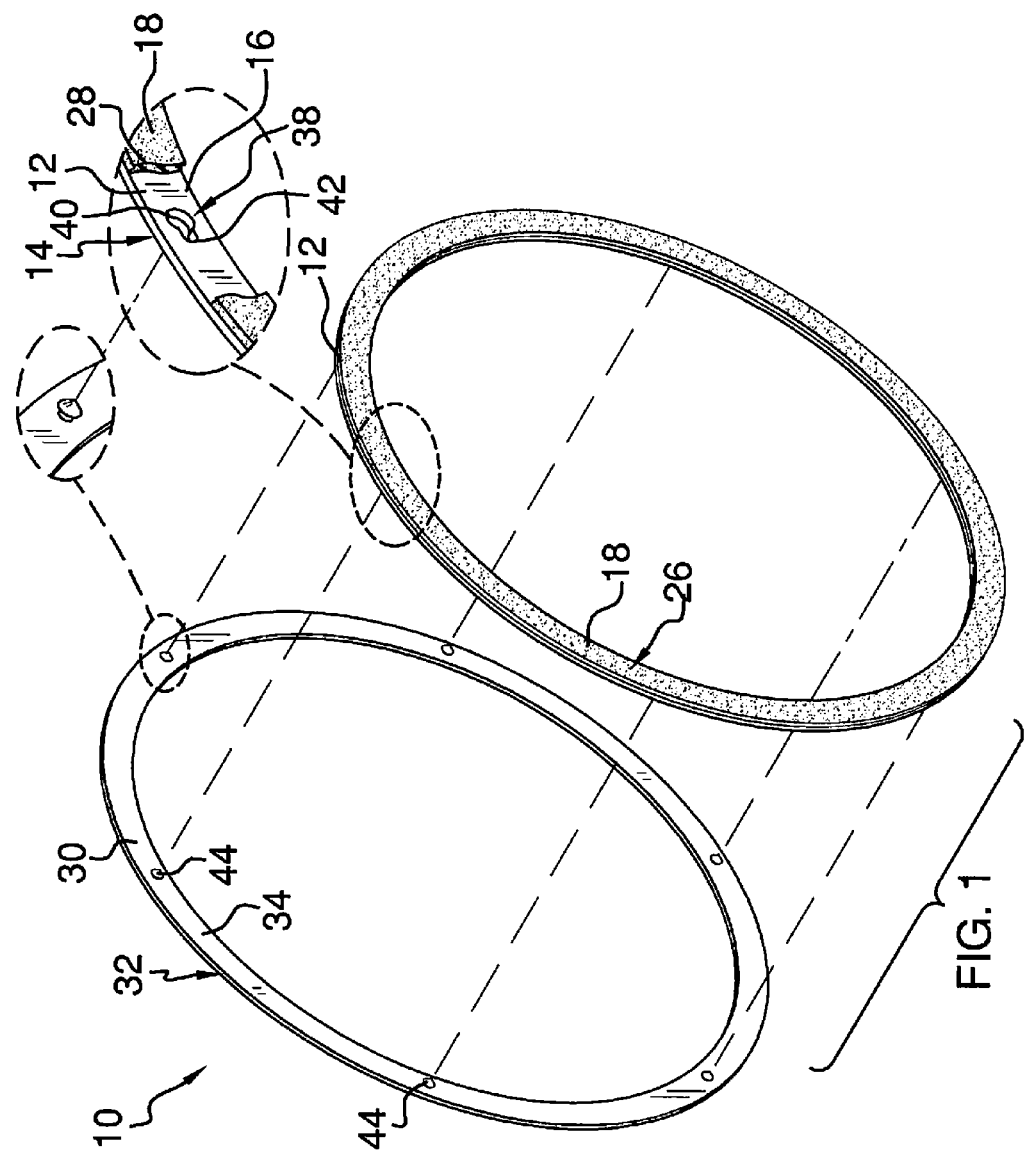
FIG. 1 is an exploded top back side perspective view of a tire decoration assembly according to an embodiment of the disclosure.
Figure 2:
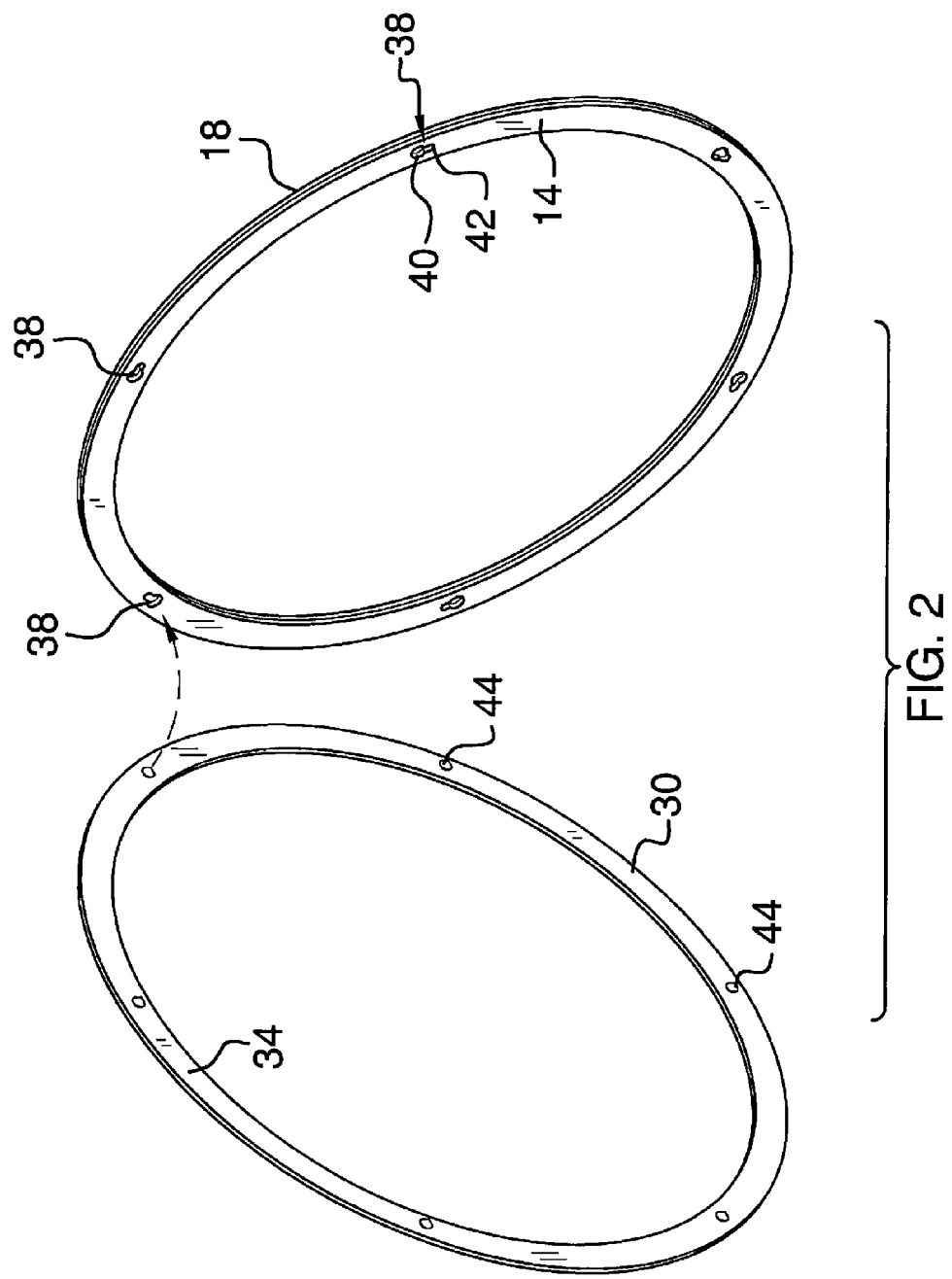
FIG. 2 is an exploded top side perspective view of an embodiment of the disclosure.

With reference now to the drawings, and in particular to FIGS. 1 through 5 thereof, a new tire decoration device embodying the principles and concepts of an embodiment of the disclosure and generally designated by the reference numeral 10 will be described.

As best illustrated in FIGS. 1 through 5, the tire decoration assembly 10 generally comprises a first annular member 12 having a front side 14 and a back side 16. A connector 18 is coupled to the back side 16 of the first annular member 12 wherein the first annular member 12 is configured for coupling to an exterior surface 20 of a sidewall 22 of a tire 24. The connector 18 fully covers the back side 16 of the first annular member 12. The connector 18 is a strip 26 of compressible material 28 such as foam. A second annular member 30 has a front side 32 and a back side 34. The back side 34 of the second annular member 30 is selectively coupled to the front side 14 of the first annular member 12 wherein the front side 32 of the second annular member 30 is displayed on the tire 24. Decorative indicia 36 may be positioned on the front side 32 of the second annular member 30. The surface of the front side 32 of the second annular member 30 may also be decorative in shape, texture, or appearance.

Figure 5:
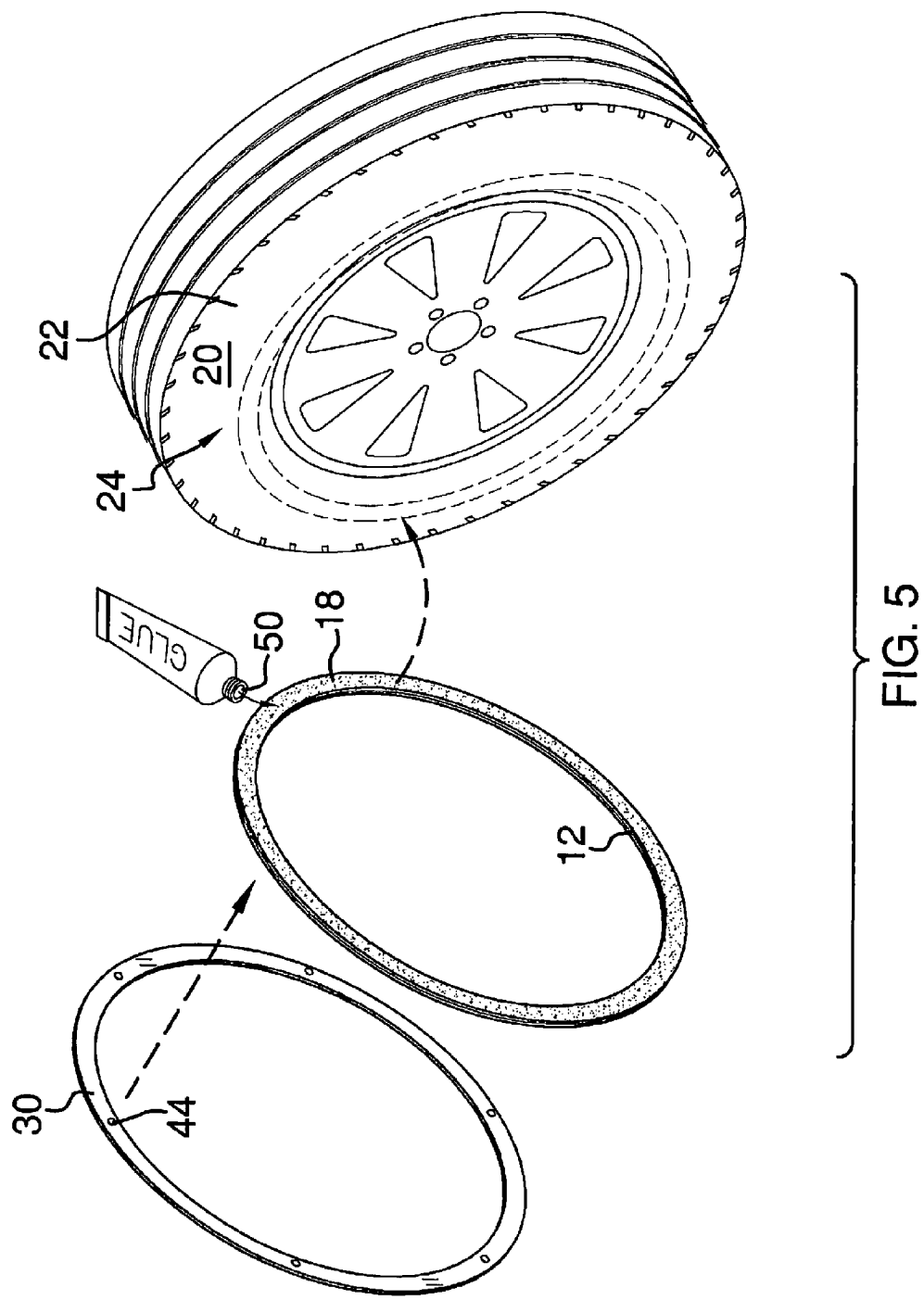
FIG. 5 is an exploded top back view of an embodiment of the disclosure.

A plurality of openings 38 may extend into the front side 14 of the first annular member 12. Each opening 38 may extend fully through the first annular member 12. Each of the openings 38 has a broad portion 40 substantially circular in shape and a slot portion 42 extending from the broad portion 40. A plurality of protrusions 44 is coupled to and extends from the back side 34 of the second annular member 30. Each of the protrusions 44 is inserted into an associated one of the openings 38 such that the second annular member 30 is coupled to the first annular member 12. Each of the protrusions 44 has a head portion 46 and a neck portion 48 extending between the head portion 46 and the front side 14 of the first annular member 12. The head portion 46 is insertable through the broad portion 40 of the associated opening 38 and the second annular member 30 is rotated such that the neck portion 48 of each protrusion 44 is slidably inserted into the slot portion 42 of the associated opening 38. The head portion 46 has a width greater than a width of the slot portion 42 of the associated opening 38 such that the head portion 46 is prevented from passing through the slot portion 42 of the associated opening 38. The connector 18 has a thickness sufficient to accommodate each head portion 46 extending through the first annular member 12 as shown in FIG. 5. As stated above, the connector 18 may be a compressible material or a void may be incorporated into the connector 18 to receive the head portion 46. An adhesive 50 is coupled to the connector 18 to secure the connector 18 to the exterior surface 20 of the sidewall 22 of the tire 24.

In use, the connector 18 is semi-permanently coupled to the tire 24 and the first annular member 12. The second annular member 30 is selectively attached to the first annular member 12 to display the front face 32 of the second annular member on the tire 24. Multiple second annular members 30 may be provided and interchanged as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:
1. A tire decoration assembly comprising:
   a first annular member having a front side and a back side;
   a connector coupled to said back side wherein said first annular member is configured for coupling to an exterior surface of a sidewall of a tire; and a second annular member having a front side and a back side, said back side of said second annular member being selectively coupled to said front side of said first annular member wherein said front side of said second annular member is configured for being displayed on the tire;

a plurality of openings extending into said front side of said first annular member;

a plurality of protrusions coupled to and extending from said back side of said second annular member, each of said protrusions being inserted into an associated one of said openings wherein said second annular member is coupled to said first annular member;

each of said openings having a broad portion and a slot portion extending from said broad portion; and each of said protrusions having a head portion and a neck portion extending between said head portion and said front side of said first annular member, said neck portion being slidably inserted into said slot portion of said associated opening, said head portion having a width greater than a width of said slot portion of said associated opening wherein said head portion is prevented from passing through said slot portion of said associated opening.

2. The assembly of claim 1, further comprising decorative indicia positioned on said front side of said second annular member.

3. The assembly of claim 1, further comprising:
said connector being a strip of compressible material; and
an adhesive coupled to said connector wherein said connector is configured for coupling to the exterior surface of the sidewall of the tire.

4. The assembly of claim 3, further comprising said connector fully covering said back side of said first annular member.

5. The assembly of claim 1, further comprising each opening extending fully through said first annular member.

6. A tire decoration assembly comprising:
a first annular member having a front side and a back side;
a connector coupled to said back side wherein said first annular member is configured for coupling to an exterior surface of a sidewall of a tire, said connector fully covering said back side of said first annular member, said connector being a strip of compressible material;
a second annular member having a front side and a back side, said back side of said second annular member being selectively coupled to said front side of said first annular member wherein said front side of said second annular member is configured to be displayed on the tire;
decorative indicia positioned on said front side of said second annular member;
a plurality of openings extending into said front side of said first annular member, each opening extending fully through said first annular member, each of said openings having a broad portion and a slot portion extending from said broad portion;
a plurality of protrusions coupled to and extending from said back side of said second annular member, each of said protrusions being inserted into an associated one of said openings wherein said second annular member is coupled to said first annular member, each of said protrusions having a head portion and a neck portion extending between said head portion and said front side of said first annular member, said neck portion being slidably inserted into said slot portion of said associated opening, said head portion having a width greater than a width of said slot portion of said associated opening wherein said head portion is prevented from passing through said slot portion of said associated opening; and
an adhesive coupled to said connector wherein said connector is configured for coupling to the exterior surface of the sidewall of the tire.

\* \* \* \* \*